Figure 1:
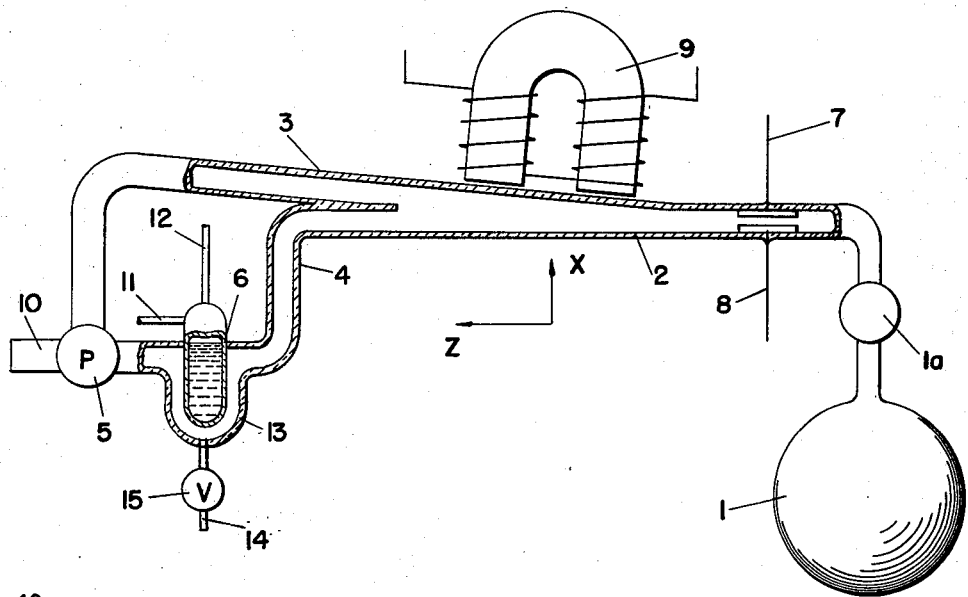

July 8, 1958 P. J. FRIEL 2,842,490
MANUFACTURE OF HYDROGEN PEROXIDE
Filed Sept. 12, 1956

INVENTOR.
PATRICK J. FRIEL
BY
ATTORNEY

United States Patent Office 2,842,490
Patented July 8, 1958

2,842,490

MANUFACTURE OF HYDROGEN PEROXIDE

Patrick J. Friel, Broomall, Pa., assignor to Sun Oil Company, Philadelphia, Pa., a corporation of New Jersey Application September 12, 1956, Serial No. 609,376

1 Claim. (Cl. 204—156)

This invention relates to the manufacture of hydrogen peroxide, and more particularly to a method for producing hydrogen peroxide by the dissociation of water vapor in a high voltage discharge tube.

It has been known for some time that water vapor at low pressures in the order of 0.1 mm. to 1.0 mm. of mercury absolute may be dissociated into hydrogen atoms and hydroxyl radicals by the action of a high voltage discharge tube, and that the dissociation products may be condensed at liquid air temperatures to yield a product containing hydrogen peroxide. (See "Discussions of the Faraday Society," No. 14, p. 104, 1953.) The maximum yield of hydrogen peroxide, formed by the union of two hydroxyl radicals, is limited to about 25 mol percent of the water vapor charged since, due to the presence of all of the hydrogen atoms at the condensing surface, the competing reactions $H+H \rightarrow H_2$ and $H+OH \rightarrow H_2O$ will also take place. Furthermore, the hydrogen peroxide is obtained as a dilute solution in water, a 57% by weight hydrogen peroxide solution being the strongest that has heretofore been obtained.

It is an object of this invention to provide a method whereby after passage of water vapor through a high voltage discharge, the hydrogen atoms and hydroxyl radicals may be substantially separated from one another, so that, on condensation, the union of hydroxyl radicals will be the chief reaction to give a high yield of a highly concentrated solution of hydrogen peroxide.

I find that the foregoing object may be attained by passing the dissociation products from the high voltage discharge through an inhomogenous magnetic field, prior to contact with a liquid air trap. Both the H atom and the OH radical are paramagnetic, and will therefore be displaced in the direction of the strongest part of the field. Since, due to inertia, displacement of the particles is inversely proportionate to their mass, the OH radical will be displaced only 1/17 the distance of the H atom. The displacement of each particle is proportional to the square of the length of its path in the field, and is also proportional to the magnetic flux of the field. It has therefore been found possible, by adjustment of the path length and the magnetic flux, to effect a sufficient separation to enable the OH radicals to be passed through one conduit to the liquid air trap, where they condense on the surface and unite to form hydrogen peroxide, and to pass the H atoms through a separate conduit to the atmosphere. Since the majority of the H atoms are thus removed from the reaction zone on the surface of the liquid air trap, very little water or molecular hydrogen will be formed thereon, and substantially all of the OH radicals will be recovered as hydrogen peroxide.

In order that those skilled in the art may more fully appreciate the nature of my invention and the method of carrying it out, an example thereof will be described in connection with Figure 1 of the accompanying drawing which is a view, partly in cross-section, of an apparatus suitable for carrying it out, and Figure 2 which is a chart illustrating the flux required to effect a displacement of H atoms.

As may be observed from Figure 1 of the drawing, the apparatus consists of a receptacle 1 in which the charge water is placed, a tube 2 of tapered cross-section for a part of its length connected at its smaller end with receptacle 1, and divided into conduits 3 and 4 at its larger end. Conduit 3 connects directly with evacuating means 5, while conduit 4 has interposed therein a liquid air trap 6.

In operation, receptacle 1 is charged with a quantity of deaerated water, and evacuating means is started up and operated to maintain the absolute pressure in tube 2 and conduits 3 and 4 at a value of about 0.1 mm. of mercury. Water vapor under the control of pressure reducing valve 1–a passes out of receptacle 1 into tube 2, which has an inside diameter of 5 cm. at its narrow end, and passes between electrodes 7 and 8 where it is subjected to high voltage discharge, in order to dissociate it into H atoms and OH radicals. These radicals then move into the tapered section of tube 2, where they are subjected to a magnetic flux of 14,400 gauss/cm.$^2$ induced by magnet 9, which has a length of 35 cm. The taper of tube 2 is such that its inside diameter at the discharge end is 10 cm., while conduit 3 has an inside diameter of 4 cm. and conduit 4 has an inside diameter of 4.5 cm. It may be calculated that the application of a magnetic flux of 14,400 gauss/cm.$^2$ over a path of 35 cm. will displace the hydrogen atoms in the "x" direction a distance of about 5 cm., while displacing the OH radicals a distance of only 0.3 cm. This degree of displacement will effect an almost complete separation of H atoms from OH radicals, the H atoms passing into conduit 3 to evacuating means 5, from which they are discharged through line 10. Substantially all the OH radicals pass through conduit 4 and condense on the wall of liquid air trap 6, which is maintained at liquid air temperature by boiling liquid air contained therein, make-up liquid air being added through line 11, while vapors are taken off through line 12. The OH radicals condensed on trap 6 unite to form hydrogen peroxide, which builds up on the wall of trap 6 as hydrogen peroxide ice. When the ice has built up to a thickness such that the heat transfer through the ice and the wall of trap 6 is inadequate to maintain the temperature of the surface of the ice low enough to condense OH radicals (about $-120°$ C.) the process is interrupted, liquid air is removed from trap 6, and the trap is allowed to warm up to a temperature such that the hydrogen peroxide will melt and fall into sump 13, from which hydrogen peroxide of high purity at a concentration approaching 100% may be removed through line 14 under the control of valve 15. After the hydrogen peroxide has been removed, trap 6 is refilled with liquid air, the apparatus is re-evacuated, and the process is placed back on stream.

While the foregoing description is directed to the manufacture of hydrogen peroxide using a specific sized apparatus with a magnetic field of specific length and flux strength, apparatus of different size and strength of field may be constructed in accordance with the following equation:

$$d_x = \left( \frac{\mu \cos(\mu H)}{2M} \right) \left( \frac{dH}{dx} \right) \left( \frac{l_x^2}{v_z^2} \right)$$

where: $d_x$ = deflection in the "x" direction
$\mu$ = magnetic moment of the particle
$(\mu H)$ = angle between the field and the axis of the magnet $M$ = mass of the particle $\frac{dH}{dx}$ = magnetic flux of the field in the "$x$" direction $l_z$ = length of the path in the field $v_z$ = velocity of the particle in the "$z$" direction Thus, for a desired deflection of the H atoms of 5 cm., the magnetic flux required for various lengths of $l_z$ may be expressed as:

$$\frac{dH}{dx} = \frac{17.6 \times 10^6}{l_z^2}$$

(for the calculation $\mu\cos(\mu H) = 1.7$ Bohr magnetrons $= 1.576 \times 10^{-20}$ erg/gauss; $v_z^2$ = the square of the "$z$" component of the most probable velocity from the kinetic theory $= 1.66 \times 10^{10}$ cm.$^2$/sec.$^2$; $M$ = mass of the H atom $= 1.66 \times 10_g{}^{-24}$).

Figure 2:
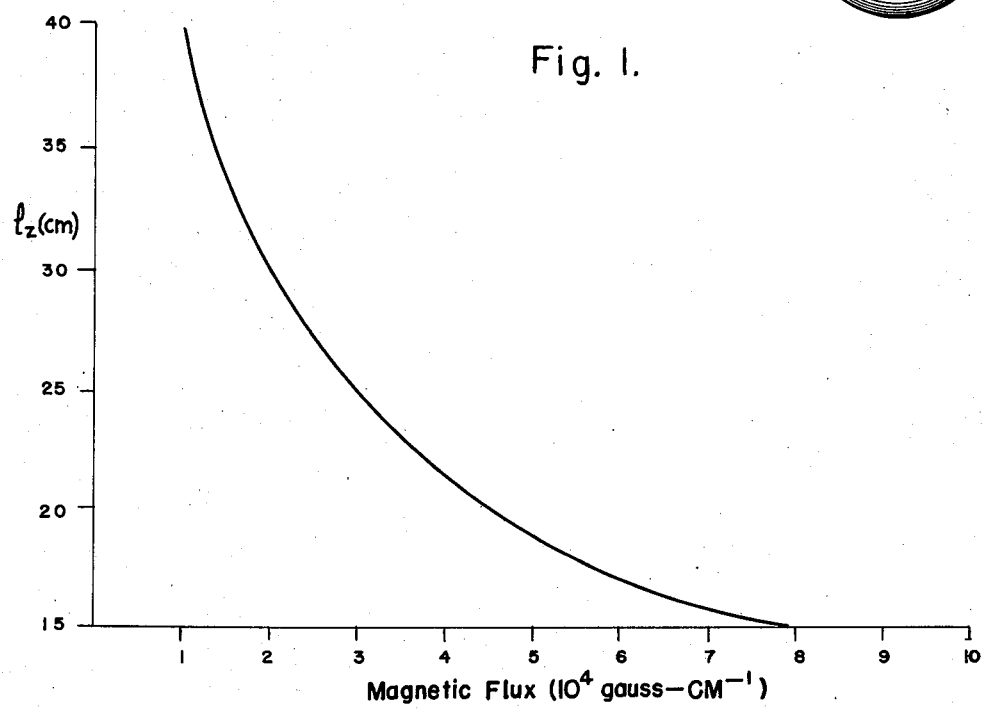

Figure 2 of the accompanying drawing is a chart illustrating the flux required to effect a displacement of H atoms of 5 cm. at various values of $l_z$ other than that of the specific example. Similar charts may be derived from the above equations for other desired values of $d_x$.

I claim:

The method of manufacturing hydrogen peroxide which comprises passing water vapor through a high voltage discharge at an absolute pressure not greater than about 1.0 mm. of mercury, therein dissociating the water vapor to hydrogen atoms and hydroxyl radicals, passing the hydrogen atoms and hydroxyl radicals through a magnetic field of a length and strength sufficient to effect separation of hydrogen atoms from hydroxyl radicals by displacement of the hydrogen atoms in the direction of the strongest part of the field, separately conducting the hydroxyl radicals to contact with a surface maintained at a temperature not in excess of $-120°$ C., and recovering hydrogen peroxide formed by the union of hydroxyl radicals on said surface.

References Cited in the file of this patent

"Discussion of the Faraday Society," No. 14, pp. 104–110 (1953).